Feb. 1, 1927.
S. PERELMAN
1,615,999
FOUNTAIN TOOTHBRUSH
Filed Dec. 4, 1925
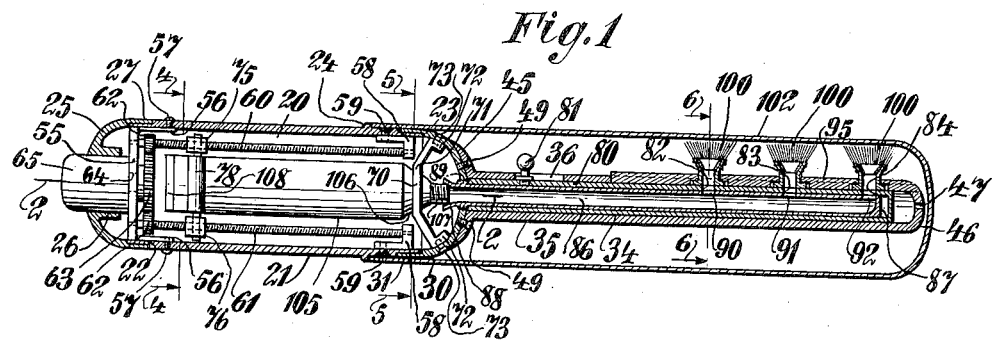
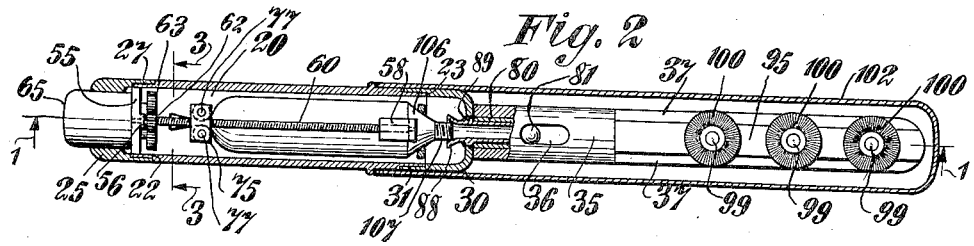
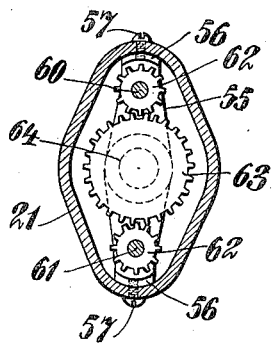
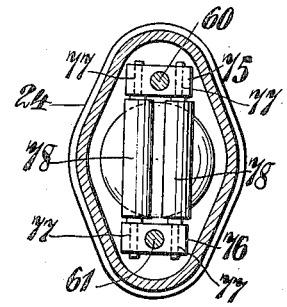
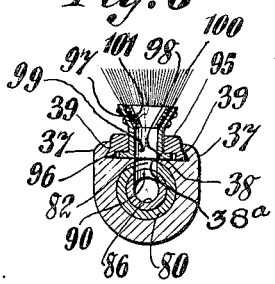
INVENTOR
Solomon Perelman.
BY
ATTORNEY Patented Feb. 1, 1927.

1,615,999

UNITED STATES PATENT OFFICE.

SOLOMON PERELMAN, OF BAYONNE, NEW JERSEY.

FOUNTAIN TOOTHBRUSH.

Application filed December 4, 1925. Serial No. 73,158.

This invention relates to a fountain tooth brush.

The object of the invention is the production of a fountain tooth brush having a hollow handle for a collapsible tube with paste and the like. The second object of the invention is the production of a fountain tooth brush with its handle reduced to small dimensions. The third object of the invention is the production of a tooth brush, in which the outlet openings for its paste can be easily closed. The fourth object of the invention is the production of a fountain brush with parts that are easily disconnected. The fifth object of the invention is the production of a tooth brush that can be easily carried in the pocket of the user. The sixth object of the invention is the production of a tooth brush to be used with a dentifrice and other material, which will be economical in the use of said dentifrice or other material. The seventh object of the invention is the production of a fountain tooth brush, with bristles disposed in an annulus.

In the accompanying drawings Fig. 1 represents a partial elevation and partial axial section as on the line 1—1 of Fig. 2 of an exemplification of the improved fountain tooth brush; Fig. 2 shows a partial top plan view and section of Fig. 1 on the line 2—2; Fig. 3 indicates an enlarged section of Fig. 2 on the line 3—3; Fig. 4 represents an enlarged section of Fig. 1 on the line 4—4; Fig. 5 shows an enlarged section of Fig. 1 on the line 5—5; Fig. 6 indicates an enlarged partial section of Fig. 1 on the line 6—6; Fig. 7 represents a left hand side view of Fig. 1 and Fig. 8 shows a right hand side view of Fig. 1.

The handle of the brush is indicated in its entirety at 20, and comprises the elliptical shaped shell 21, with the shouldered ends 22 and 23, and projection 24. An elliptical shaped rear cap 25 has formed therewith the tubular opening 26 and the shouldered end 27. The shouldered end 27 of said cap is normally located in clamped position with the shouldered end 22 of the shell 21. An elliptical shaped front cap 30, has formed therewith the shouldered end 31, which is normally located in clamped position with the shouldered end 23 of the shell 21. The shank of the tooth brush is indicated in its entirety at 34 and comprises the cylindrical tubular portion 35, with the guide opening 36 and joins with the U-shaped tubular portion having the side members 37. A seat 38 having discharge openings 38ª and dovetailed guides 39 are formed with said U shaped portion. An elliptical shaped flange 45 is formed at one end of the shank 34. The other end 46 of the shank 34 is spherical shaped, and has formed therein the small opening 47. The flange 45 is detachably connected to the front cap 30 by means of the screws 49. At one end of the shell 21 is located the journal bearing bracket 55, which has extending therefrom the lugs 56. The latter bear against the inner face of the shell 21 and are fastened thereto by means of the screws 57. At the other end of the shell 21 are detachably fastened the journal brackets 58, by means of the screws 59. Screws 60 and 61 have their shanks at their ends respectively journaled in the journal brackets 55 and 58. A pinion 62 is fastened to each of the screws 60 and 61. A spur gear 63 is fastened to one end of the pin 64, and the latter is journaled in the bracket 55, and to the other end of said pin is fastened the operating knob 65.

Within the front cap 30 is fastened the supporting bracket 70, with the tapered seat 71 and the flanges 72. The latter are detachably fastened to the front cap 30, by means of the screws 73.

A pair of cross heads 75 and 76 are respectively in threaded engagement with the screws 60 and 61. A pair of similar spindles 77 have their ends journaled in said cross heads and each is provided with the roller 78. A cylindrical tube 80 is slidably located in the shank 34 and has extending therefrom the adjusting knob 81, which latter extends through the guide opening 36 in the cylindrical tubular portion 35 of the shank of the brush. Outlet openings 82, 83, and 84 are formed in the tube 80.

An inner pipe 86, closed at one end of its ends 87 and with a funnel shaped inlet opening 88 at its other end, is located within the tube 80. Adjacent to its opening 88 it has formed therewith the external threads 89, which engage an axial threaded opening in the cap 30. Openings 90, 91, and 92 are formed in the pipe 86 in the longitudinal direction thereof.

A slidable cap 95 has formed therewith the dovetailed portions 96, which engage the dovetailed guides 39. Tubular supports each with the upper tapered portion 97 and the flange 98 at its lower end, are journaled in openings in the cap 95. The openings 99 in each of said supports can engage with the openings 82, 83, 84 and 90, 91 and 92. Bristles 100, are clamped between the tapered portions 97 and the conical sleeves 101, which latter are held in place by rivets and which locate the rubbing ends of the bristles in an annulus. An elliptical cover 102 encloses the shank 34 with its appurtenances, and is detachably clamped to the shell 21 with its open end abutting against the projection 24 thereof.

To use the tooth brush a collapsible tube 105 having the funnel shaped outlet end 106 with the nipple 107 and the closed end 108, is filled with the requisite dentifrice or paste. The front cap 30 is removed from the shell 21, and the closed end 108 of the tube 100 is inserted between the rollers 78. The cap 30 is then again located in place on the shell 21, and the funnel shaped outlet end 106 of the tube 105 is located on the tapered seat 71, while the nipple 107 of the tube is brought to bear against the funnel shaped inlet opening 88 of the inner pipe 86. The tube 80 is located, by means of the adjusting knob 81 to bring its outlet openings 82, 83 and 84 in line with the openings 90, 91 and 92 of the pipe 86. Then to discharge some of the paste from the tube 105 and charge the bristles 99 therewith, the user turns the knob 65, by means of which the screws 60 and and 61 turn through the interposed gears. By this means the cross heads 75 and 76 are moved toward the shank 34 of the brush and the paste is forced from the tube 105 by collapsing the same, by virtue of the movement and rotation of the rollers 78.

The paste enters the pipe 86 and is directed to the bristles 100. When the tooth brush is not in use the tube 80 is moved, by means of the knob 81, to close the openings therein with respect to the openings 90, 91 and 92 of the pipe 86. The opening 47 prevents an air cushion in the shank of the tooth brush when the tube 80 is moved toward its outer end. It will be noted that the tubular supports having the openings 99 are journaled to the cap 95 and that they therefore can turn when the tooth brush is being used, but they can be tightly fitted in the cap 95 to prevent them turning. It will be noted that when the brush is not in use the cover 102 is located in place to maintain the shank 34, the bristles 100 and their appurtenances clean.

Having described my invention what I desire to secure by Letters Patent and claim is:

1. In a fountain tooth brush the combination of a hollow handle adapted to hold a collapsible tube for paste, a hollow shank extending from one end of said handle, tubular supports carried by said shank, bristles clamped to said supports, a tube closed at one end and open at the other slidably supported in said shank and having outlet openings adapted to register with the openings of said tubular supports, a pipe closed at one end and a funnel shaped inlet at its other end located in said tube with its open end in connection with said handle, said pipe having outlet openings adapted to register with the openings of said tubular supports and dispensing means in the hollow handle to discharge the contents of said collapsible tube into said pipe and through said tubular supports.

2. In a fountain tooth brush the combination of a hollow handle, a pipe closed at one end and open at the other end, the said open end extending into said handle, said pipe having outlet openings in the longitudinal direction thereof, a tube slidably supported on said pipe, said tube having openings adapted to register with the openings in the pipe, a shank with one end fastened to said handle encircling said tube, a slidable cap supported on the shank, tubular supports adapted to register with the outlet openings in said pipe and tube extending from said slidable cap and bristles clamped to said supports.

3. In a fountain tooth brush the combination of a hollow handle adapted to hold a collapsible tube for paste and the like, dispensing means for said paste located in said handle, a hollow shank with one end extending from said handle, said shank having a guide opening formed therein, a slidable cap supported on said shank, said cap having discharge openings formed therein, tubular supports rotatively connected to said cap, bristles clamped to each tubular support, the bristles for each tubular support forming an annulus, a tube open at one end and closed at the other supported in said shank, said tube having outlet openings adapted to register with the openings through said tubular support, an adjusting knob extending from said tube extending through the guide opening of said shank, and a pipe closed at one end and open at the other with the main portion thereof located in said tube and its open end extending into said handle, said pipe having outlet openings adapted to register with the openings of said tubular supports.

In testimony whereof I affix my signature.

SOLOMON PERELMAN.